Jan. 1, 1963    D. R. GROSS    3,071,474
FOOD FLAVOR RECOVERY
Filed May 24, 1961

INVENTOR.
David R Gross
BY
Ralph Hammar
Attorney

3,071,474
FOOD FLAVOR RECOVERY
David R. Gross, North East, Pa., assignor to
Fred L. Rahal, North East, Pa.
Filed May 24, 1961, Ser. No. 112,383
10 Claims. (Cl. 99—105)

This invention relates to the recovery by adsorption in the vapor phase of the volatile flavoring compounds normally lost during the processing of food and food products and to the subsequent release of these compounds from the adsorbing medium by a solvent. It is particularly advantageous in the processing of fruit juices, jams, preserves, purees and concentrates.

Figure 1:
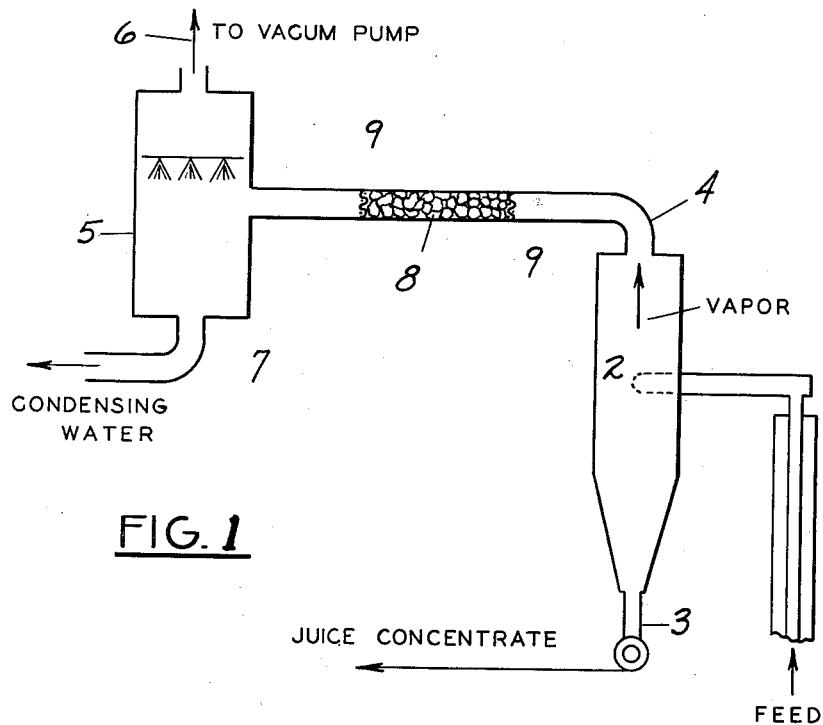
Figure 2:
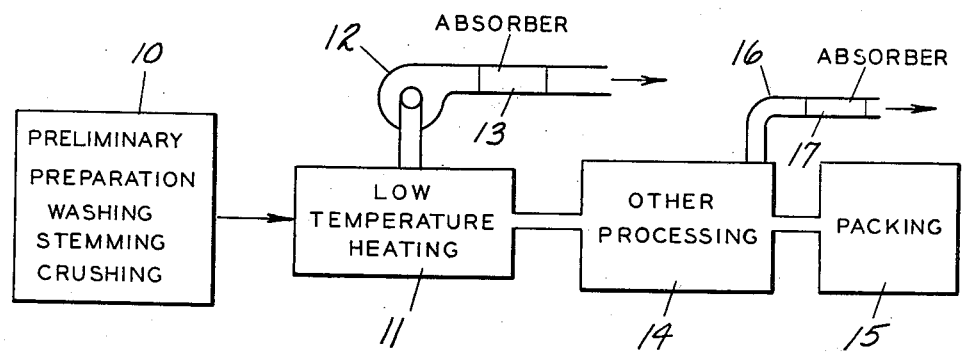

In the drawing, FIG. 1 shows the flavor recovery applied to vacuum juice concentration and FIG. 2 is a block diagram showing flavor recovery in continuous fruit processing.

There are many constituents in foods that combine to produce the characteristic flavor and aroma associated with the particular food product. In many of the foods a large proportion of the flavor constituents is volatile, thus accounting for the typical aroma of the food product. It had been determined that the volatile chemical compounds, include esters, aldehyde, acids, and other organic compounds, many of them present in very minute amounts. The esters predominate by far and are largely responsible for flavors and aroma. An ester may be regaded as an organic salt, and is a combination of an alcohol and an acid. Esters are fairly easily formed and are also subject to hydrolysis or to break up into their components—alcohol and acid. Thus, there is definitely a possibility that the distillation of esters may not produce an end result exactly like the flavor compounds present in the original fruit because of the heat involved. Most of these compounds are only slightly soluble, or completely insoluble, in water. Thus, although they may have fairly high boiling points, they do have appreciable vapor pressures and, when associated with water, evaporate due to the phenomenon of steam distillation. Thus, when a food product containing these volatile compounds is comminuted, heated, or subjected to concentration by evaporation, many of the volatile flavor constituents evaporate.

Several methods have been suggested for the recovery of these volatile flavors. One of them specifies the distillation of a portion of the water in a fruit juice. This water vapor, carrying volatile compounds, is then fractionated to concentrate the volatile constituents. This recovery method is usually a separate operation preceding vacuum concentration of the juices and, furthermore, subjects the juice and volatile flavors to temperatures of approximately 212 degrees F. so some of the components may be broken down. Other methods involve the freezing of the vapors eluted by passage of air or a gas through the fruit or juice, or the fractionation by various low temperature traps of the condensate from an evaporator. All require extensive equipment and are subject to the disadvantage that the full flavor spectrum is not recovered.

In the present invention, the volatile flavors are trapped by adsorbing them on a suitable adsorbent such as activated charcoal. Since adsorbents of this type show a wide range of affinity for organic compounds, the adsorption process can be so designed to trap the volatile flavors regardless of their chemical characteristics. Furthermore, adsorbents of this type are very efficient even at low temperatures and in the presence of water vapor, so that it is not necessary to subject the food and its vapors to high temperatures in order to fractionate and concentrate the volatile flavors. For instance, in steam distilling a fruit juice, it is necessary to pass the vapor into a fractionating column in order to secure a volatile essence of a hundredfold or better. In the present invention the vapors, whether they are those arising at normal processing temperatures from the food product, or whether they are scrubbed out of the food product by a gas, are simply passed through the adsorbent where the volatile flavors are trapped. Furthermore, this adsorbent can be placed in the vapor line of a vacuum evaporator, such as used to concentrate various fruit and vegetable juices. Here the adsorbent picks up the volatile flavors, while permitting the water vapor to pass on through to be condensed in the usual manner.

After the volatile flavors have been adsorbed, it is necessary to release these flavors from the activated charcoal. Although it has been known for many years that when charcoals are used to absorb such compounds as alcohols from the atmosphere, the charcoal can be revived and a portion of the alcohol reclaimed by prolonged steaming or evacuation of the charcoal. However, there are several disadvantages to the use of this method for the recovery of adsorbed flavors. First of all, the recovery compound would be present as a diluted solution on suspension in water and not only would the water generate some chemical changes in the flavors, but it would necessitate further processing steps to obtain a concentrated moisture-free essence. Second, it is a well known property of activated charcoal that the total adsorptive capacity consists of, in part, a certain retentive capacity or a certain percent of the adsorbed material. This is referred to in the text, Adsorption, by C. L. Mantell.

A certain percent of the adsorbed material thus remains in the charcoal and could only be removed by steaming if temperatures were raised high enough, and this would be undesirable in dealing with flavors. This percentage is not in just a proportioned amount of each compound constituting a flavor but will be made up of those materials which are most strongly held by the charcoal. Most adsorbents release preferentially compounds of lower boiling points and lower molecular weight. This means that if the charcoal saturated with a flavor was desorbed by steaming or evacuation at lower pressures, an unbalanced essence would be obtained. For example, a sample of charcoal was used to absorb the volatile flavor of grape juice. Upon analysis, the grape juice used showed 220 parts per million total esters present of which 6 parts per million were methyl anthranilate. After adsorption, the charcoal was subjected to a vacuum of 5 microns for 3 hours. The charcoal was then steamed at temperatures up to 300° F. for approximately 5 hours. In each case the resulting vapors were caught in low temperature receivers and analyzed. The analyses showed that on a total ester basis approximately 35% of the esters still remained in the charcoal. In addition, no positive test was obtained for methyl anthranilate in this distillate. The same charcoal was then subjected to solvent recovery and the resulting extract analyzed. This extract contained over 99% of the remaining esters and all of the methyl anthranilate had been adsorbed from the grape juice. Both the distillate from the first exhaustion and the extract from the solvent step were then introduced to a vapor chromatograph. The two chromatographs showed plainly by the existence of many more peaks and the high boiling range that the solvent extract had removed from the charcoal, many more flavor constituents than had been obtained by vacuum evacuation or steam.

Another disadvantage of using steam to remove the flavors from the adsorbent, even if recovery were reasonably good, is that the flavor is finally obtained in a highly diluted form. Not only is it inconvenient to use in the presence of large quantities of water, but this water will promote changes in the chemical make up of the flavor itself. Various rearrangements and hydraulic reactions take place when esters, in particular, are in contact with water. Furthermore, the use of high vacuums or steam makes necessary complex equipment and refrigeration capacity to trap essence.

The selection of the proper solvent to extract the adsorbed materials depends on several conditions. Obviously a solvent should have a boiling point well below the compounds being adsorbed. Furthermore, this solvent should have good distillation properties and be easily separated from the dissolved essence with a minimum of essence loss. Also, the solvent should be one in which the essence alcohol formaldehyde dissolves easily. There are several solvents which answer these qualifications. Many solvents are available for extracting the flavor essence from the charcoal, among which are low boiling ethers (e.g. ethyl ether, methl propyl ether), hydrocarbons (e.g. pentane), and halogenated hydrocarbons (methylene chloride). This list is not exhaustive. Note that the solvent per se may be poisonous but since it is eliminated before the extract is used, there is no danger.

In many foods, as for example fruits, the volatile flavor constituents will have a wide range of boiling points and molecular weights. Thus, distillation methods will produce an essence of limited concentration and then only with elaborate fractionating stills. By adsorbing the organic volatile compounds to the exclusion of water, this dilution is prevented.

Although there are several materials which will adsorb organic compounds of the type found in fruit flavors, one of the best is activated charcoal, a non polar adsorbent. These are charcoals which will adsorb 50% or more of their weight of an organic compound and generally have little or no affinity for water vapor.

In the drawing, 1 indicates a vacuum fruit juice concentrator which leads through a vapor separator 2 having at its lower end an outlet 3 for the concentrated juice. The flavor which remains in the concentrated juice is, of course, retained. A substantial part of the flavor constituents are carried by the vapor discharged through vapor line 4 to a condenser 5 having a vacuum line 6 connected to its upper end and a condensing water outlet 7 at its lower end. To recover the flavor constituents there is arranged in the line 4 an adsorber such as a mass 8 of adsorbent such as activated charcoal confined between screens 9. The charcoal has no affinity for water but has a great affinity for the complicated organic chemicals mking up the volatile flavor or aroma spectrum. Substantially all of the volatile or vapor phase flavor spectrum is trapped in the adsorber and little or none is lost in the condenser. The flavor recovery equipment is not limited to juice concentrators. The vapor line 4 can be connected to any source carrying fruit flavor or aroma.

The following Examples I, II, III and IV were done using a small, continuous vacuum evaporator of the ascending tube type. This evaporator had an evaporating surface of 2.5 sq. ft. A surface condenser was used so that condensate could be collected for analysis. A vacuum of 28" of mercury was obtained. At normal evaporative rates the vapor velocity in the vapor line was approximately 5000 ft. per min. A Dry Ice trap was placed in the outlet from the mechanical vacuum pump so as to collect uncondensed vapors for analysis.

*Example I*

A "synthetic" fruit juice was made by dissolving sucrose in water to a Brix of 15. Citric acid was added to the extent of 1.00%. Then ethyl n-butyrate was added to the juice so as to be present at a level of exactly 200 parts per million. Ethyl n-butyrate was selected as typical of the volatile fruit flavor constituents.

A segment of stainless steel pipe was inserted in the vapor line 4 between the separator 2 and the condenser 5, suitably screened so as to hold ½ lb. of activated charcoal. The length of this adsorbent column was 4 inches. A Dry Ice trap was inserted in the vacuum line 6.

The juice containing a total of 4 gms. of ethyl n-butyrate was circulated through the evaporator until tests showed that all of the ethyl n-butyrate had been evaporated. The condensate and the contents of the Dry Ice trap were analyzed and showed no ethyl n-butyrate to be present.

The activated charcoal 8 was then removed from the vapor line and extracted continuously for 3 hours with 1 lb. of ether. An analysis of the ether extract showed 3.64 grams of ethyl n-butyrate to be present. Further extraction for 1 hour removed an additional .22 gram of ethyl n-butyrate. This represented an overall 96% recovery of the ethyl n-butyrate present in the original juice. The activated charcoal was extracted again with additional increments of solvent until, finally, the solvent showed no trace of the ethyl n-butyrate. At that point 99.4% of the ester originally present in the juice had been recovered from the charcoal.

*Example II*

A sample of red raspberry juice containing 100 parts per million total volatile esters (determined as ethyl acetate) was circulated through the evaporator until the juice showed only 20 parts per million of esters remaining. The condensate from the condenser 5 and Dry Ice trap in the vacuum line 6 showed no ester content.

Upon extraction of the activated charcoal with di-ethyl ether and subsequent evaporation of the ether a few drops of an oil with raspberry-like odor was produced. Re-incorporation of this oil into the concentrated juice and dilution to the original solids level produced a juice with flavor and aroma comparable to a fresh juice.

*Example III*

A 500 lb. sample of grapes was washed, the stems removed, and the grapes crushed. These crushed grapes were then passed through a continuous heat exchanger which heated the grapes to a temperature of 160 degrees F. The heated crushed grapes were discharged into a closed kettle having a 4" vent pipe in which was placed 2 lbs. of activated charcoal A small fan was placed following the activated charcoal in order to assist in pulling the vapors through the absorbent. The crushed grapes were then pressed by conventional means in order to extract the juice. This juice was then suitably clarified and concentrated in the vacuum evaporator to ¼ its original volume. Inserted in the vapor line of the vacuum evaporator was 3 lbs. of activated charcoal. At the conclusion of the operation the activated charcoal in the vent pipe from the hot-crushed-grape kettle was extracted with ether in a manner previously described. Upon distillation of the ether, 4 gms. of a highly fragrant material was left. Approximately 90% of this material were esters of various molecular weights, the rest being comprised of alcohols, organic acids, and aldehydes. The activated charcoal from the vacuum evaporator was similarly extracted and the resultant yield was 24 gms. of an oily fragrant liquid. The two extracts were combined and an analysis showed a total ester content to be 23 gms. The methyl anthranilate content was 1.2 gms. A sample of the same grapes heated and pressed, but without adsorption of the vapors from the heated grapes, was steam distilled in a manner analogous to present atmospheric essence recovery systems. The total volume of distillate was 4 lbs. and this 4 lbs. of distillate contained 21 gms. of an ether extractable oil. The total ester content was 16 gms. and the methyl anthranilate content was 0.6 gm.

Upon reconstitution of the concentrates and the addition of the flavor in the proper proportions, a single-strength grape juice was formed. Upon submission of this grape juice to a taste panel, comparison of the reconstituted grape juice in which the flavors had been reclaimed by activated charcoal with a reconstituted juice in which the flavors had been recovered by steam distillation—the taste panel indicated that the former juice had a fresher, more true grape flavor, no different from a freshly pressed single-strength grape juice.

*Example IV*

A sample of freshly extracted orange juice was separated from its pulp and then concentrated in the vacuum evaporator to one fifth its volume. The activated charcoal in the vapor line was extracted with ether. Upon distilling off the ether, a fragrant orange oil was obtained. Since concentration was effected at 100 degrees F. and temperatures during the ether extraction are at this same level, no heat damage occured. Upon reconstitution of the orange juice, a fresh flavored juice was obtained.

*Example V*

A large commercial-sized vacuum evaporator was modified so as to recover the volatile flavors by absorption. This evaporator was of the turbo-film type and had an evaporative capacity of 2000 lbs. of water per hour. The vapor line was 14" in diameter and in a segment of this line was placed a one foot long column of activated charcoal (approximately 30 lb.). Freshly pressed grape juice having a methyl anthranilate content of 5 milligrams per liter was fed to the evaporator at a rate of 250 gallons per hour and concentrated to one fourth its volume in one pass. Periodic analyses were made of the condenser water. After 20 hours of operation traces of methyl anthranilate began to appear in the water. At this point the charcoal was removed and extracted with ether. The ether-free essence was rich grape flavor and when added in proper proportion to the reconstituted grape juice, produced a juice no different from the original juice.

The flavor recovery by adsorption is not only in greater quantity, but is of a higher quality than is possible by distillation techniques. Also, heat damage is eliminated.

The higher quality flavor permits shipment of frozen juice concentrates of greater concentration with resultant savings in shipping weight and storage space. For example, at present, frozen orange juice concentrate is concentrated fivefold and cut back to threefold with fresh single strength juice in order to obtain acceptable flavor. The fivefold concentrate by itself is not of acceptable flavor. However, when the fivefold concentrate is mixed with the adsorbed or recaptured flavor, it is of acceptable flavor and requires no cut back with fresh juice.

FIGURE 2 shows a continuous process for non-citrus fruits such as grapes, raspberries, strawberries, cherries, peaches, apples and the like where the entire cycle from fresh fruit to container may be an hour or less. In the preliminary preparation indicated by block 10, the fruit is in the fresh state and its color, flavor and aroma are trapped within the cells and skin. At block 11, the fruit is heated to a low temperature, e.g. 160° F., at which the color, flavor and aroma constituents release. This may be a pasteurizing operation and is the first operation of Example III. Such release is essential for further processing. To prevent flavor loss, the heated fruit is confined within a closed vessel and vapors are withdrawn by fan 12 and discharged through a mass 13 of activated charcoal to collect the flavor and aroma constituents. Inert gas could be bubbled through the fruit with the same effect of carrying the flavor laden vapors through the adsorber. Upon leaving the vessel, the fruit may be further processed at 14 and packed at 15, all part of a continuous process. During the further processing, flavor laden vapors pass through vapor line 16 containing an activated charcoal adsorber 17. The flavor constituents reclaimed from adsorbers 13 and 17, as described above, are mixed with the fruit prior to packing to restore the fresh fruit flavor. The processing indicated at 14 could be a variety of steps depending upon the end product. For single strength juices, pressing is required. Juice concentrates require vacuum evaporation. Purees require comminuting. Jams and preserves require sugar, acid and pectin additions. Packing may involve canning or freezing. For flavor and aroma integrity, the flavor recovery should be at low temperatures to prevent breakdown of the flavor constituents. Hence the importance of recovery while the fruit is in vessel 11.

The continuous processing of FIG. 2 eliminates alcohol fermentation which is troublesome in batch processing where large masses of fruit juices or comminuted fruit must be held in storage vats.

Another example of flavor recovery follows:

*Example VI*

Fresh-frozen red raspberries which had been stored at sub-zero temperatures in closed 30 lb. cans were thawed sufficiently to empty them from the cans. The raspberries were dumped into a comminuter and from there passed via a closed system to a heat exchanger where they were heated to a temperature of 160° F. The fruit exited from the heat exchanger into a closed kettle 11 as described in Example III. This kettle was fitted with a vent pipe and a fan 12 to withdraw vapors through the vent pipe. In the pipe was fitted an adsorber 13 in the form of a wire basket containing 2 lbs. of activated charcoal.

A total of 63,000 lbs. of fruit was processed in the manner described above. From the kettle a portion of the fruit went to presses where the juice was extracted and filled into cans for freezing. The remaining fruit went to a pulper where seeds were removed and a puree made.

At the conclusion of the run, the carbon (charcoal) was removed from the vent pipe and extracted with several volumes of ether in a continuous, laboratory-sized extractor. The ether was then distilled off by conventional means leaving a highly fragrant, oily liquid totaling 82 grams. Analysis of this liquid showed 65 grams total esters and lesser amounts of organic acids, alcohols and aldehydes.

The correct proportional amount of this aroma or flavor essence was added back to samples of the juice and of the puree. These samples had a marked fresh raspberry flavor easily differentiated from samples of juice and puree that had not had the recovered essence returned to them.

The characteristics of the solvent for recovering the flavor essence from the activated charcoal are: First, it must be a good solvent for the flavor compounds. Second, it must have low surface tension for quick desorption from charcoal. Third, it must have a low boiling point compared to the flavor compounds to be separated easily by distillation from the essence. Fourth, it must have good distillation properties, i.e. must not form azeotropic mixtures with any of the flavor compounds it is desired to retain in the essence. Examples of solvents meeting these requirements are ethyl ether (ether), boiling point 34.6° C.; pentane, boiling point 36.2° C.; methylene chloride, boiling point 40.1° C. These requirements are not met by ethyl alcohol, boiling point 78.5° C. In any cases where alcohol (ethyl) has been specified for extraction the final product would be an extract in alcohol (usually of a flower essence for use in perfumery), and not the pure essence, alcohol free. The boiling point of alcohol is such that distillation to remove it from the essence would result in the loss with the alcohol of many low boiling constituents of the essence. Furthermore, alcohol forms azeotropes with many higher boiling compounds which means that distilling off the alcohol would also distill off certain of these substances. Thus the use of alcohol would not be possible if it were desired to obtain a pure essence containing the original constituents in the same proportion and solvent free.

The deficiency of alcohol and of steam vacuum recovery is demonstrated by the following:

Example VII 300 liters of grape juice, well mixed, were analyzed and found to contain:

|  | Mg./liter |
|---|---|
| Volatile esters | 260 |
| Methyl anthranilate (a high boiling ester typical of grape aroma) | 6 |
| Alcohols (as ethyl) | 75 |

There were other flavor elements present in the juice. Methyl anthranilate was used as a control first, because it is characteristic of grape flavor; second, because the analytical methods for detecting its presence, even in minute quantities, are quick and accurate; and finally, because it is a good control.

A. 100 liters of the above juice was concentrated to one-fifth its starting volume (a degree of concentration frequently employed in the juice industry). In the vapor line of the concentrator was placed an adsorber containing 2 pounds of activated charcoal. The vapor subsequently was condensed in a refrigerated trap and held for analysis.

Analysis of the concentrated juice showed:

|  | Mg./liter |
|---|---|
| Volatile esters | 248 |
| Methyl anthranilate (100 mg. total) | 5 |
| Alcohol | None |

Analysis of the condensed water showed only traces of volatile esters and alcohol. Note, the loss in flavor constituents is substantially in direct proportion to the removal of water during concentration. If the juice at this point were reconstituted by the addition of water, it would lack about four-fifths of the flavor constituents present in the fresh juice.

The charcoal was subjected to continuous, total reflux extraction with ethyl ether for 6 hours and the ether removed from the extract by atmospheric distillation, leaving the pure solvent free essence.

Analysis of the essence showed:

|  | Grams |
|---|---|
| Total weight of essence | 34 |
| Total weight moisture free | 30.2 |
| Methyl anthranilate (462 mg. total) | 0.462 |

As can be seen from the above, almost all of the volatile organic constituents lost during evaporation were recovered and an almost quantitative recovery of methyl anthranilate was made. 100 liters of the fresh juice contained 600 mg. methyl anthranilate, 562 mg. were recovered.

B. A second 100 liters of the above juice was concentrated as in "A" and then the charcoal was extracted with ethyl alcohol as above and the ethyl alcohol removed by distillation:

|  | Grams |
|---|---|
| Total weight of essence | 8 |
| Total weight moisture free | 7.1 |
| Methyl anthranilate (104 mg. total) | .104 |

C. The third 100 liter portion of the above juice was concentrated in the same manner as "A" and "B." This time the charcoal was placed in a suitable chamber and steam at 3 pounds pressure allowed to flow through it for 2 hours. The issuing vapors were condensed in a trap held at −10° C. Then the steaming was discontinued and the charcoal subjected to a vacuum of 15 microns for 2 hours. A trap inserted in the vapor line at −40° C. froze out the vapors.

Analysis of the combined condensations:

|  |  |
|---|---|
| Weight from steaming | 7000 grams. |
| Weight from vacuum trap | 280 grams. |
| Total weight | 7280 grams. |
| Total volatile ester content | 13 grams. |
| Total methyl anthranilate | Not detectable. |

The charcoal remaining from the treatment of "C" was then extracted with ether as outlined in "A." The ether was removed from the essence by distillation and the essence analyzed:

|  | Grams |
|---|---|
| Total weight of essence | 21.4 |
| Total weight moisture free | 9.0 |
| Methyl anthranilate (303 mg. total) | 0.303 |

This shows that an appreciable amount of essence remained in the charcoal after steaming and vacuum treatment and that, furthermore, the major portion of the methyl anthranilate remained in the charcoal.

As the examples show, simply steaming the charcoal or subjecting to high vacuum or to solvent extraction with ethyl alcohol will not remove completely the essence and, furthermore, will produce an unbalanced essence because of the retention to a greater degree of the higher boiling flavor compounds.

This application is a continuation in part of application Serial No. 842,079, filed September 24, 1959, now abandoned.

What is claimed as new is:

1. The process of preparing orange juice concentrate which comprises concentrating fresh orange juice by low temperature evaporation at which heat damage to the orange juice and its flavor compounds does not occur, passing the vapors through an activated carbon adsorbent having a preferential affinity as compared to water for the complex organic compounds comprising the volatile flavor and aroma constituents of the orange juice, and removing the adsorbed compounds from the adsorbent by a solvent having (a) a low boiling point compared to the flavor compounds, (b) low surface tension, and (c) which does not form azeotropic mixtures with the flavor compounds, distilling the solvent from the resultant solution at low temperature at which heat damage to the flavor compound does not occur and mixing the remaining flavor compounds with the concentrate to restore the flavor to that comparable to the fresh juice.

2. The process of preparing fruit juice concentrate which comprises pressing the fruit and concentrating the resultant juice by evaporation, conducting the vapors present during pressing and concentration through an activated carbon adsorbent having a preferential affinity as compared to water for the complex organic compounds comprising the volatile flavor and aroma constituents of the fruit, removing the adsorbed compounds from the adsorbent by a solvent having (a) a low boiling point compared to the flavor compounds, (b) low surface tension, and (c) which does not form azeotropic mixtures with the flavor compounds, distilling the solvent from the resultant solution and mixing the remaining flavor compounds with the concentrate to restore the natural flavor constituents.

3. The process for the recovery of the complex water insoluble organic compounds providing the volatile flavor and aroma constituents of fruits which are normally lost with vapors during processing which comprises passing the vapors through a non polar adsorbent having a preferential affinity for the compounds as compared to water, eluting the compounds from the adsorbent with a solvent having (a) a low boiling point compared to the flavor compounds, (b) low surface tension, and (c) which does not form azeotropic mixtures with the flavor compounds, and distilling the solvent from the solution at low temperature at which heat damage to the flavor compound does not occur.

4. The process for recovery of volatile organic food flavor and aroma constituents normally escaping with vapors during processing which comprises conducting the flavor and aroma containing vapor through an activated carbon adsorbent having a preferential affinity as compared to water for volatile organic food flavor and aroma constituents, eluting the adsorbed flavor and aroma constituents with a solvent having (*a*) a low boiling point compared to the flavor compounds, (*b*) low surface tension, and (*c*) which does not form azeotropic mixtures with the flavor compounds, and distilling the solvent from the resultant solution at low temperature at which heat damage to the flavor compound does not occur to leave the flavor and aroma constituents.

5. The process of preparing frozen orange juice concentrate which comprises concentrating fresh orange juice four or more fold by low temperature evaporation at which heat damage to orange juice and its flavor compounds does not occur, passing the vapors through activated charcoal having a preferential affinity as compared to water for the complex organic compounds comprising the volatile flavor and aroma constituents of the orange juice, removing the adsorbed compounds from the charcoal by a solvent having (*a*) a low boiling point compared to the flavor compounds, (*b*) low surface tension, and (*c*) which does not form azeotropic mixtures with the flavor compounds, distilling the solvent from the resultant solution at low temperature at which heat damage to the flavor compound does not occur and mixing the remaining flavor compounds with the concentrate to restore the flavor spectrum to that comparable to fresh juice, and packing and freezing the mixture.

6. In fruit processing including the steps of pasteurizing at low temperature at which heat damage does not occur followed by processing to the desired end product and packing into containers, the process for recovery of volatile organic fruit flavor and aroma constituents which comprises holding the fruit in a closed vessel during pasteurizing and conducting vapors from the same through an activated carbon adsorbent having a preferential affinity as compared to water for volatile organic food flavor and aroma constituents, eluting the adsorbed flavor and aroma constituents from the carbon by a solvent having (*a*) a low boiling point compared to the flavor compounds, (*b*) low surface tension, and (*c*) which does not form azeotropic mixtures with the flavor compounds, distilling the solvent from the resultant solution at low temperature at which heat damage to the flavor compound does not occur and mixing the remaining flavor compounds with the end product prior to packing.

7. The process for recovery of volatile organic fruit flavor and aroma constituents which comprises heating the fruit to a temperature below that causing heat damage but sufficient to release flavor and aroma constituents from the fruit cells, inducing the withdrawal of vapors from the fruit, and conducting said vapors through an activated carbon adsorbent having a preferential affinity as compared to water for volatile organic food flavor and aroma constituents, removing the flavor and aroma constituents from the adsorbent by a solvent having (*a*) a low boiling point compared to the flavor compounds, (*b*) low surface tension, and (*c*) which does not form azeotropic mixtures with the flavor compounds, and distilling the solvent from the resultant solution at low temperature at which heat damage to the flavor compound does not occur.

8. The process of preparing orange essence which comprises concentrating fresh orange juice by low temperature evaporation at which heat damage to the flavor compounds does not occur, passing the vapors through an activated carbon adsorbent having a preferential affinity as compared to water for the complex organic compounds comprising the volatile flavor and aroma constituents of the orange juice, removing the adsorbed compounds from the adsorbent by ether, and distilling off the ether to leave a fragrant orange essence.

9. The process of preparing fruit essence which comprises pressing the fruit and concentrating the resultant juice by evaporation at low temperature at which heat damage to the flavor compound does not occur, conducting the vapors present during pressing and concentration through an activated carbon adsorbent having a preferential affinity as compared to water for the complex organic compounds comprising the volatile flavor and aroma constituents of the fruit, removing the adsorbed compounds from the adsorbent by ether, and distilling off the ether to leave the essence.

10. The process for recovery of volatile organic food flavor and aroma constituents normally escaping with vapors during processing which comprises conducting the flavor and aroma containing vapor through an activated carbon adsorbent having a preferential affinity as compared to water for volatile organic food flavor and aroma constituents, eluting the adsorbed flavor and aroma constituents with a solvent selected from the group consisting of ethyl ether, methyl propyl ether, methylene chloride, and distilling the solvent from the resultant solution at low temperature at which heat damage to the flavor compound does not occur to leave the flavor and aroma constituents.

References Cited in the file of this patent

UNITED STATES PATENTS

| | | |
|---|---|---|
| 2,506,776 | Carnarius | May 9, 1950 |
| 2,773,774 | McCarthy | Dec. 11, 1956 |